(12) United States Patent
Jadallah et al.

(10) Patent No.: US 9,398,347 B2
(45) Date of Patent: Jul. 19, 2016

(54) SYSTEMS AND METHODS FOR MEASURING QUALITY OF EXPERIENCE FOR MEDIA STREAMING

(75) Inventors: Anas Jadallah, Waterloo (CA); Bradley Murray, Waterloo (CA); Scot Loach, Waterloo (CA)

(73) Assignee: SANDVINE INCORPORATED ULC, Waterloo, Ontario (CA)

( * ) Notice: Subject to any disclaimer, the term of this patent is extended or adjusted under 35 U.S.C. 154(b) by 1015 days.

(21) Appl. No.: 13/118,528

(22) Filed: May 30, 2011

(65) Prior Publication Data

US 2012/0311126 A1    Dec. 6, 2012

(51) Int. Cl.
| | |
|---|---|
| G06F 15/16 | (2006.01) |
| H04N 21/647 | (2011.01) |
| H04L 12/24 | (2006.01) |
| H04N 21/238 | (2011.01) |
| H04N 21/24 | (2011.01) |
| H04L 29/06 | (2006.01) |

(52) U.S. Cl.
CPC ...... *H04N 21/64723* (2013.01); *H04L 41/5067* (2013.01); *H04L 65/4069* (2013.01); *H04L 65/80* (2013.01); *H04N 21/238* (2013.01); *H04N 21/23805* (2013.01); *H04N 21/2402* (2013.01)

(58) Field of Classification Search
None
See application file for complete search history.

(56) References Cited

U.S. PATENT DOCUMENTS

| | | | |
|---|---|---|---|
| 2002/0138643 A1* | 9/2002 | Shin et al. ............. | 709/232 |
| 2005/0089043 A1 | 4/2005 | Seckin et al. | |
| 2007/0180106 A1 | 8/2007 | Pirzada et al. | |
| 2010/0128130 A1 | 5/2010 | Howcroft | |

(Continued)

FOREIGN PATENT DOCUMENTS

| | | |
|---|---|---|
| EP | 1482681 A1 | 12/2004 |
| WO | 2009009141 A1 | 1/2009 |

(Continued)

OTHER PUBLICATIONS

Sandvine Inc., "Fall 2010 Global Internet Phenomena Report", Oct. 20, 2010, Waterloo, ON, Canada http://www.sandvine.com/downloads/documents/2010%20Global%20Internet%20Phenomena%20Report.pdf.

(Continued)

*Primary Examiner* — John B Walsh
(74) *Attorney, Agent, or Firm* — Gowling WLG (Canada) LLP; Neil Henderson

(57) ABSTRACT

A method for measuring quality of experience for media streaming in a network is provided, the method includes: identifying a media stream; detecting an event related to the media stream indicative of a quality of experience (QoE) as perceived by a subscriber; measuring a metric relating to the detected event; and determining a quality of experience measurement based on the metric. A system for measuring quality of experience for media streaming as perceived by subscribers in a network is provided, the system having: a media flow recognition module configured to identify a media stream; a QoE event handler operatively connected to the media flow recognition module and configured to detect an event related to the media stream indicative of a quality of experience as perceived by a subscriber; a metric measurement module operatively connected to the QoE event handler and configured to measure a metric relating to the detected event; and a quality of experience calculation module operatively connected to the metric measurement module and configured to determine a quality of experience measurement based on the metric.

20 Claims, 12 Drawing Sheets

(56) References Cited

U.S. PATENT DOCUMENTS

2012/0311721 A1* 12/2012 Chen et al. .................. 726/27
2013/0041998 A1* 2/2013 Kordasiewicz et al. ...... 709/224

FOREIGN PATENT DOCUMENTS

| WO | 200901546 | 2/2009 |
|----|-----------|--------|
| WO | 2009015461 | 2/2009 |

OTHER PUBLICATIONS

European Patent Office, Communication, European patent application No. 11190950.3, Mar. 19, 2012, Munich GermanyEuropean Patent Office, Communication, European patent application No. 11190950.3, Mar. 19, 2012, Munich Germany.

European Patent Office, Extended European Search Report, European patent application No. 11190950.3, Mar. 12, 2012, Munich Germany.

European Patent Office, Examination Report for Appln. No. 11190950.3, dated Oct. 28, 2013.

European Patent Office, Summons to Attend Oral Proceedings for EP Appln No. 1119095.3, dated Apr. 24, 2014.

David Soldani, Man Li, Renaud Cuny, "QoS and QoE Management in UMTS Cellular Systems", Prefix and Chapter 8, pp. xiii-xiv and 293-314, Chichester: John Wiley & Sons, Aug. 2006.

wikipedia.org, "Distance", http://en.wikipedia.org/wiki/Distance, Accessed: Aug. 15, 2011.

* cited by examiner

| Data/Key | Name | Type |
|---|---|---|
| Key | Subscriber MAC address | Fact |
| | Content Id hash code | Fact |
| | Request time | Fact |
| Data | Stream start time | Fact |
| | Encoded bit rate | Fact |
| | Encoded duration | Fact |
| | Downstream bytes counter | Fact |
| | Upstream bytes counter | Fact |
| | Downstream packets counter | Fact |
| | Upstream packets counter | Fact |
| | Downstream payload bytes counter | Fact |
| | Upstream payload bytes counter | Fact |
| | Subscriber IP address | Fact |
| | Geographical location of subscriber | Dimension |
| | Content provider name | Dimension |
| | Content delivery network | Dimension |
| | Stream type | Dimension |
| | Client device | Dimension |
| | Client device type | Dimension |
| | Video Container | Dimension |
| | Transport protocol | Dimension |
| | Session protocol | Dimension |
| | Operating system | Dimension |
| | Browser | Dimension |
| | Audio codec | Dimension |
| | Video codec | Dimension |
| | Resolution | Dimension |
| | Last access time | - |

Fig. 9

| Data/Key | Name | Type |
|---|---|---|
| Data | Stall event counter | Calculated Metric |
| | Stall event duration | Calculated Metric |
| | Bit rate transition counter | Calculated Metric |
| | Server start latency | Calculated Metric |
| | Is restarted | Calculated Metric |
| | QoE | Calculated Metric |

Fig. 9 (Cont'd.)

SYSTEMS AND METHODS FOR MEASURING QUALITY OF EXPERIENCE FOR MEDIA STREAMING

FIELD

The present disclosure relates to the provision of media streaming on networks. More specifically, the present disclosure relates to systems and methods for measuring Quality of Experience (QoE) for progressive and adaptive media streaming in a digital network.

BACKGROUND

Broadband Internet subscribers have a certain expectation of the quality of their experience using the Internet, whether the subscribers are merely surfing web pages or streaming video. Over-the-top (OTT) video, video that uses broadband but does not require any affiliation to the broadband network, is becoming the dominant user of Internet bandwidth in mature markets, having the largest median usage per subscriber of any application type in the Internet. As the demand for Internet video is increasing there are often issues with the network capability and capacity to deliver the video at a quality level that is acceptable to the subscribers. As such, subscribers are complaining about a lower level of quality of experience.

It has been shown that many subscribers switch Internet Service Providers (ISPs) as they become frustrated by the service and the inability of the ISP to effectively deal with QoE. As ISPs are continuously looking for ways to stay competitive, QoE is becoming a more important measurement aspect to ISP businesses.

As QoE is traditionally considered a subjective measure, it is difficult to properly quantify. Relying on subscribers' opinions and scoring may not be an achievable solution as it may be unavailable and insufficient. Besides, an ISP cannot wait for subscribers' input to fix a problem in the ESP's network, because for each subscriber who complains many more experience the problem and may simply switch providers.

Conventional approaches to QoE, particularly for wireless communication networks tend to address protocols such as Real Time Streaming Protocol (RTSP) and Voice Over IP (VoIP). However, a large amount of video on the Internet is delivered as "progressive" or "adaptive" media. Further, conventional systems and methods focus on the same statistics used for QoS calculations such as "jitter time" for RTSP and Mean Opinion Score (MOS) for VoIP.

Therefore, there is a need for systems and methods with improved capability of measuring and improving the quality of experience for end-users of progressive and adaptive media streaming in a network environment.

SUMMARY

In one aspect, a system for filtering progressive and adaptive media streaming to obtain measures of quality of experience is provided. The system captures events and measures the perceived average quality of experience across the network, on per subscriber and per session bases. The system is preferably codec agnostic In another aspect, a method for measuring quality of experience for media streaming in a network is provided, the method includes: identifying a media stream; detecting an event related to the media stream indicative of a quality of experience as perceived by a subscriber; measuring a metric relating to the detected event; and determining a quality of experience measurement based on the metric.

In some cases, the media streaming is progressive media streaming. In other cases, the media streaming is adaptive media streaming.

In some cases, the event detected is a buffer stall and the measuring includes measuring an average number of buffer stall events as an indicator of quality of experience in the network. The measuring may include measuring an average duration of the buffer stall event as an indicator of quality of experience in the network.

In some cases, the event is media start latency and the measuring comprises measuring an average media streaming start latency as an indicator of quality of experience in the network.

In some cases, the event is media streaming restarts after buffer stall events and the measuring comprises measuring an average number of media streaming restarts after buffer stall events as an indicator of quality of experience in the network.

The event may also be the number of bit rate transitions for adaptive media streaming and the measuring comprises measuring an average number of bit rate transitions for adaptive media streaming as an indicator of quality of experience in the network.

In yet other cases, the event includes a plurality of events and the measuring consists of selecting a subset of the metrics based on the media stream and aggregating the subset to measure quality of experience per subscriber and per media session in the network.

In some cases, the method further includes taking corrective action on the media stream or network based on the average quality of experience as perceived by the subscriber.

The method may further be designed such that determining the measured metrics are measured without regard to the codec used to encode the media stream.

In another aspect, a system for measuring quality of experience (QoE) for media streaming as perceived by subscribers in a network is provided, the system having: a media flow recognition module configured to identify a media stream; a QoE event handler operatively connected to the media flow recognition module and configured to detect an event related to the media stream indicative of a quality of experience as perceived by a subscriber; a metric measurement module operatively connected to the QoE event handler and configured to measure a metric relating to the detected event; and a quality of experience calculation module operatively connected to the metric measurement module and configured to determine a quality of experience measurement based on the metric.

In some cases, the QoE event handler is configured to detect at least one of the events from the group of buffer stalls, media start latency, media streaming restarts and bit rate transitions and the metric measurement module is configured to measure at least one of the group of average number and duration of buffer stall events, average media start latency, average number of restarts after buffer stall events and average number of bit rate transition events.

In other cases, the QoE event handler is configured to detect a plurality of events and the metric measurement module is configured to measure a subset of metrics related to the plurality of events.

In some cases, the system further includes a media session manager operatively connected to the QoE event handler and wherein the media session manager is configured to track and store attributes related to subscribers' quality of experience.

In some cases, the system further has a metric aggregation module configured to aggregate the subset of metrics for measuring the quality of experience as perceived by subscribers.

In some cases, calculation module triggers an indication if the determined quality of experience is below a threshold value.

The system may further include a quality of experience improvement module configured to modify the media stream based on the quality of experience measurement. In some cases, the quality of experience improvement module is configured to shape media flows with unnecessarily high quality of experience. In other cases, the quality of experience improvement module redirects requests from a congested resource to a less congested secondary resource with equivalent content.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 9 is a table illustrating possible data to be maintained in a media session manager;

DETAILED DESCRIPTION

Figure 1:
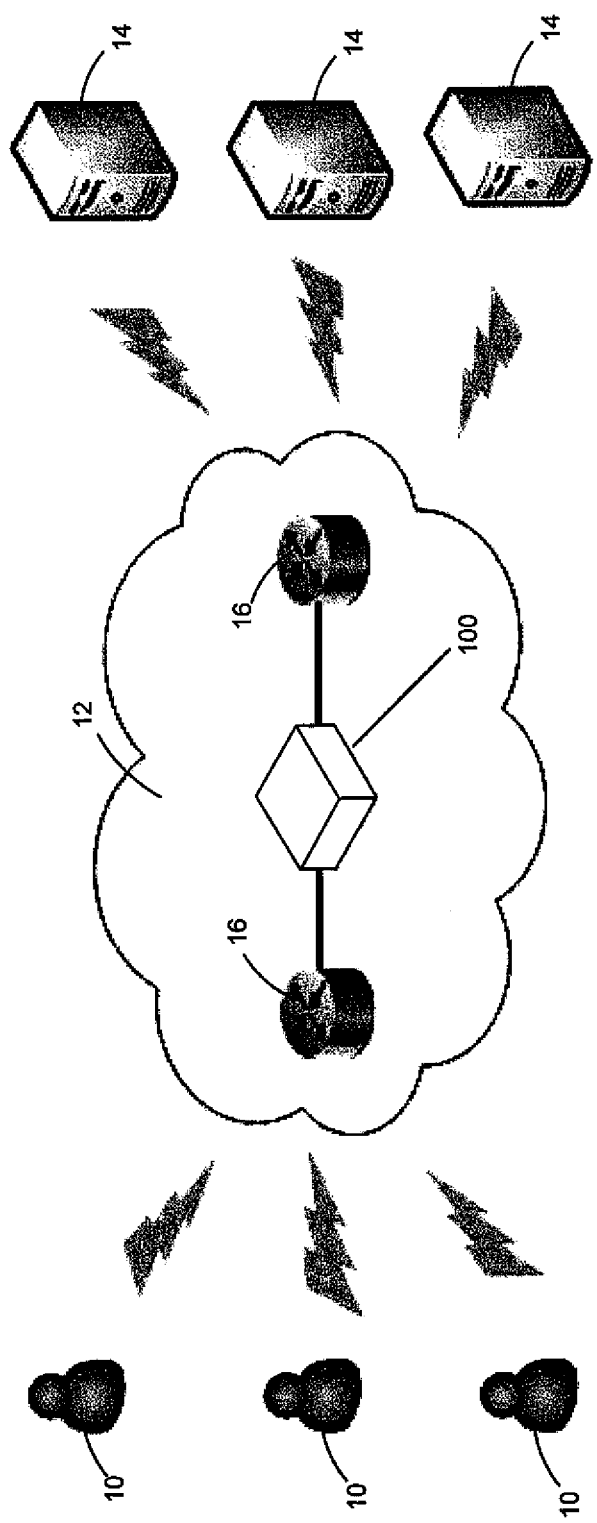
FIG. 1 illustrates a block diagram of a network using a system for measuring QoE.

There is a need for methods and systems that monitor quality of experience. In particular, methods and systems that captures subscriber events, that is, events which are related to the subscribers' perceived quality of experience (QoE), notify ISPs of undesirable experience in a network and trigger events that are intended to improve QoE before subscribers start to consider or actually change Internet Service Providers (ISPs) (sometimes referred to as "churn"). Generally, the present disclosure provides systems and methods designed to measure and improve the quality of experience for media streaming in a network.

Although sometimes used somewhat interchangeably in industry, in this application, the term "Quality of Experience" (QoE) is intended to be different from the term "Quality of Service" (QoS). In particular, QoS typically refers to an attempt to objectively measure the ability of the network to provide service at an assured level by analyzing quality of service related statistics such as: jitter time, packets lost, delayed, or dropped. On the other hand, in this application, QoE refers to a measure of the actual subscribers' perception of the performance of the service. Such perception influences subscribers' satisfaction, which can be translated into subscriber churn and significantly impact the competitiveness and business results of ISPs. In particular, QoE is intended to be measured from events that occur at subscribers' devices that are related to the subscribers' experience when receiving media content, for example, video, audio or interactive content.

The embodiments of the systems and methods for measuring QoE for media streaming described herein are intended to be efficient, scalable and adaptable for use in a network situation. The methods and systems provided are intended to measure average QoE per subscriber and per video session from analyzing subscribers' experience for all videos watched in the network. The embodiments herein are also intended to process large volumes of data in a reasonable amount of time and to be codec agnostic, in other words adaptable to various codecs including the ability to adapt to new codecs developed with time.

The embodiments of the systems and methods for measuring QoE for media streaming are described herein as network based, in contrast to measuring QoE as an endpoint of the media stream, for example at a client or server. A network based approach may be preferred by an ISP or others as there may be no access to be able to gather data from an endpoint. For example, an Internet Service Provider wants to measure the QoE being experienced by its Internet subscribers, but it does not have access to or ownership of the subscriber's PC (the client) or the content provider's data center (the server).

Although Digital Signal Processing (DSP) techniques have widely been used in evaluating video quality, particularly at the endpoints. DSP may not be practical in relation to a network based solution. For example, DSP typically requires intensive processing in order to evaluate video quality, which would be inefficient and may have issues scaling to a network solution. DSP typically also requires deep knowledge of each codec, which makes it non-adaptable to new codecs. Furthermore, DSP cannot generally handle Digital Rights Management (DRM) or other end-to-end encryption. End-to-end encryption is frequently used in OTT video, for example, using DRM for copyright purposes. DRM systems encrypt the video or media signal so that a device inspecting the video in a network would be unable to process the signal. The media is only decrypted at the endpoints, thus a system for measuring QoE may not be able to inspect the encoded media. However, embodiments of the network based QoE system described herein are intended to be able to analyze the traffic to determine attributes of the media and video and to track bit rates without the need to inspect the encrypted media signal itself.

FIG. 1 illustrates an exemplary environment in which a system for measuring Quality of Experience (QoE) 100 may be implemented. The environment includes multiple subscribers' devices 10 connected to multiple Media Streaming Servers (MSS) 14 via a network 12 or multiple networks. Subscribers' devices 10 may include various devices, including, for example personal computers, laptops, tablet computers, mobile phones, TVs, gaming devices, handheld digital devices or combinations of devices. Media Streaming Servers (MSS) 14 may include video providers, Content Delivery Networks (CDN), broadcast sources, or any source of media content. The network 12 may include various network types of designations, including for example, Local Area Networks (LAN), Wide Area Networks (WAN), Public Switched Telephone Networks (PTSN), mobile networks, the Internet or a combination of various networks.

Through the network 12, subscribers can connect using their devices 10 to one or more MSS 14 and ask for media content, such as video or audio content. MSS 14 typically responds with a stream containing the requested media using a supported streaming protocol.

As shown in FIG. 1, the network 12 includes a system for measuring QoE and typically also includes many network devices 16. Network devices 16 are known in the art and may include routers, switches, bridges, hubs, repeaters or combinations of devices. The purpose of these network devices 16 is to forward packets across the network from source to destination. The QoE system 100 is preferably positioned in the network 12 such that all data can be passed to or passed through the QoE system 100 for analysis. However, in some embodiments, a subset of data may pass through the QoE system 100 and statistical analysis or the like may be used to determine full network QoE. In some embodiments, the network-based QoE system 100 may monitor all media between a set of subscribers' devices 10 and media streaming servers 14. By monitoring multiple devices and servers, the QoE system 100 may be able to identify and isolate problems related to shared resources, such as congested network links or slow Content Delivery Networks. In FIG. 1, three subscribers' devices and three servers have been illustrated as connected to the network for illustrative purposes. However, in practice, there may be millions of subscribers' devices 10 and servers 14. The QoE system may be a standalone system operatively connected to the network 12 in order to receive data, such as media stream or media traffic flows, or the QoE system 100 may be included or incorporated into a network device 16. In particular examples, the QoE system 100 may be positioned at an ISP gateway to monitor data or media streams of that ISP or in proximity to a specific MSS 14 to monitor traffic from the MSS 14. It would be understood that other positions are contemplated that allow the QoE system 100 to monitor media streams.

As the QoE system 100 is a network based system, the QoE system 100 is intended to be configured to correlate network packets into groups that represent media streams in real time from a large amount of network traffic. This contrasts with a system operating on an endpoint, which would typically use an operating system to manage this function.

A large amount of media on the Internet is delivered as "progressive download" media. Progressive download media means the media file is encoded at a certain bandwidth using a certain protocol and is available on a server 14 for subscribers to request. Once a subscriber's device 10 requests the media, the media file is transferred to the subscriber's device 10, typically, without re-encoding or repackaging. Since files are usually encoded with the data occurring earlier in the playback at the start of the file, the subscriber can begin playback of the media before the entire file has been downloaded. However, smooth playback is only achieved when the subscriber's device 10 continues to download the media file at a rate faster than they are consuming the media stream. Other media may be "adaptive streaming" media. Adaptive streaming media means the media file uses a protocol that detects a subscriber's device 10 bandwidth and CPU capacity in real time and adjusts the bit rate of the media stream accordingly.

The system for measuring QoE 100, sometimes referred to as a "QoE system" can generally be deployed in two modes: an inline mode or an offline mode. In an offline deployment, the QoE system 100 is placed outside the data flow and receives a copy of each packet and discards the packet once the payload inspection is complete. In an inline deployment, the QoE system 100 is deployed inline with the data flow or traffic and the QoE system 100 looks at or inspects the payload before forwarding a packet onto the packet's destination.

Figure 2:
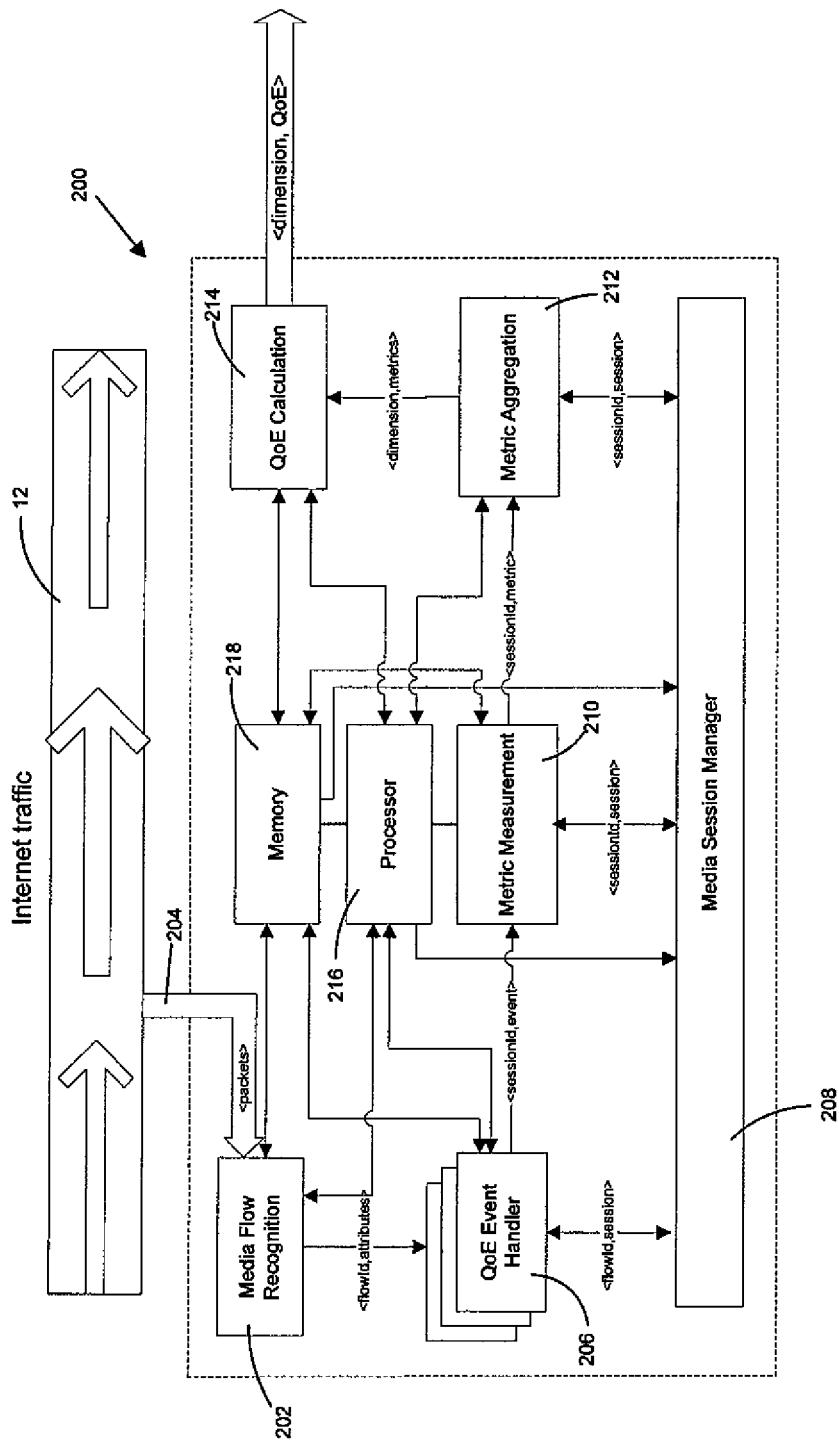
FIG. 2 illustrates a block diagram of some of the components of a system for measuring QoE, when deployed using an offline mode.

FIG. 2 is a block diagram illustrating an embodiment of a QoE system 200 deployed in an offline mode. The small arrows in FIG. 2 show the flow of information between modules of the QoE system 200. The QoE system 200 includes a media flow recognition module 202 configured to receive packets 204 from the network 12. The media flow recognition module 202 detects packet or media flow that may contain streaming data and determines attributes of the media flow. The media flow recognition module 202 transfers data relating to recognized media streams, for example, a flow identification (id) and associated attributes of the media flow, to a QoE event handler 206. The QoE system 200 will typically include a plurality of QoE event handlers 206, one for each event, as described below. Each QoE event handler 206 communicates with a media session manager 208, which keeps track of the history and properties of media flows. The media session manager 208 and the QoE event handlers 206 are operatively connected to a metric measurement module 210. In particular, the media session manager 208 and each QoE event handler 206 are configured to transfer session data and event data to the metric measurement module 210.

The metric measurement module 210 measures various metrics related to QoE events that are related to subscribers' perceived quality of experience. These metrics are then relayed to a metric aggregation module 212 which aggregates the metrics for various dimensions of interest, as explained below with reference to FIG. 9. The aggregated metrics are then used by the QoE calculation module 214 to produce an indicator of the quality of experience for each dimension based on aggregated metrics. Once the indicator of the QoE is determined, the QoE calculation module may trigger an alarm or otherwise report the indicator if the indicator shows a low or inconsistent quality of experience is being observed per subscriber and/or per session.

It will be understood that each module may be operatively connected, via for example internal cabling, to a processor 216 that coordinates activity among the modules. In some cases, each module may be equipped with its own processor. The modules are further operatively connected to a memory component 218, which may include both volatile and non-volatile memory. In an alternative, each module may include a memory component.

Although described as separate modules herein, it will be understood that the modules of the QoE system 200 may be integrated and combined in various ways or may be standalone modules. The modules detailed herein are intended to aid in measuring and improving the quality of experience for progressive and adaptive media streaming and are used to explain the flow of information and processes in the systems and methods and may not be required to be separate modules, for example, in some cases, the metric measurement and aggregation may be done by a metric module and the metric module may relay information to a QoE calculation module.

Figure 3:
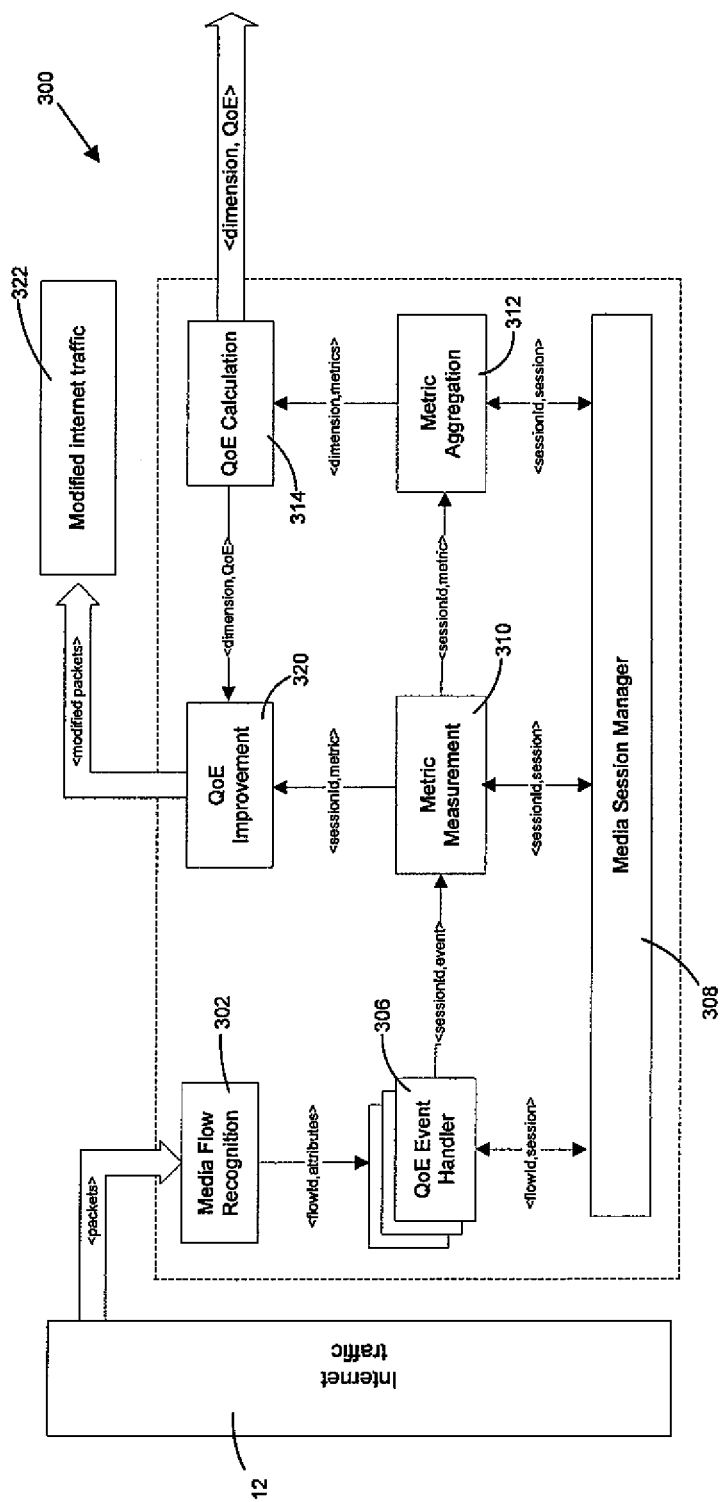
FIG. 3 illustrates a block diagram of some of the components of a system for measuring and improving QoE, when deployed using an inline mode.

FIG. 3 is a block diagram illustrating an embodiment of a QoE system 300 deployed in an inline mode. The QoE system 300 includes a media flow recognition module, 302, a QoE event handler 306, a media session manager 308, a metric measurement module 310, a metric aggregation module 312 and a QoE calculation module 314, as in the QoE system 200 described above in relation to FIG. 2. The QoE system 300 includes at least one processor (not shown explicitly) and at least one memory component (not shown explicitly), operatively connected to the modules of the QoE system 300. The QoE system 300 further includes a QoE improvement module 320, which, on receiving results from the QoE calculation module 314, may take action to modify traffic 322, which is intended to improve the quality of experience for the current media session as well as for similar media sessions in the future. The QoE improvement module 320 may store, or may retrieve from the memory component target, values for the measured metrics of the QoE of a subscriber and/or of a session. The QoE improvement module 320 may take action to modify traffic at least partly based on a comparison between the target values and the results received from the QoE calculation module 314. The modified traffic 322 is then forwarded on to the packet's destination.

Figure 4:
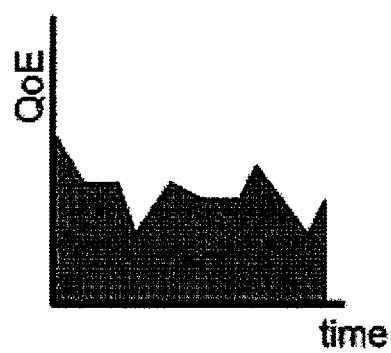
FIG. 4 is a graph illustrating a typical subscriber's QoE over time.

FIG. 4 is a graph illustrating the changing QoE experienced by a subscriber over time. When the QoE is low, as shown by the valleys in the graphs in FIG. 4, the subscriber may be displeased with the media streaming. By calculating, and in some embodiments actively modifying the QoE aspects of the traffic, it is intended that the periods of low QoE, the valleys, be reduced, and that the QoE remains more constant, and/or is improved over time.

Figure 5:
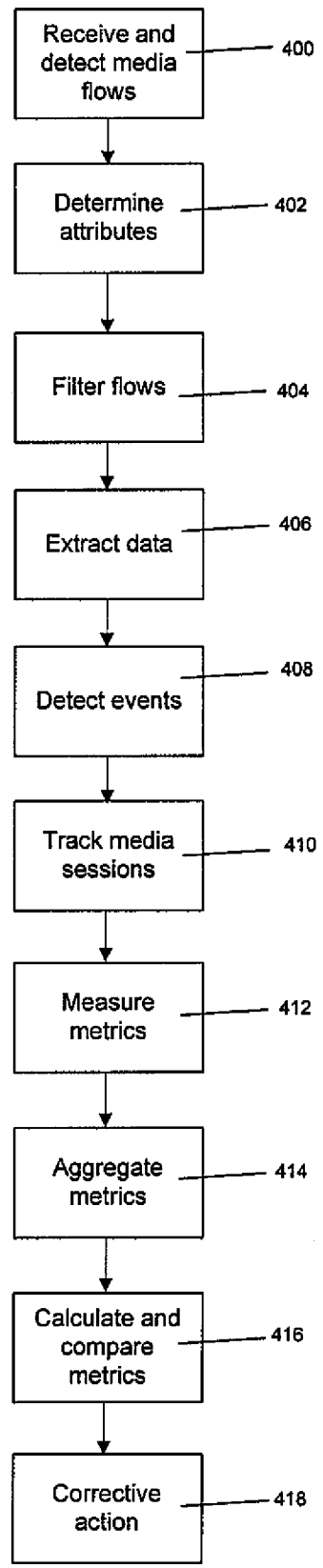
FIG. 5 is a flow chart of a method for measuring and improving QoE.

FIG. 5 is a flow chart of an embodiment of a method for measuring and improving QoE. The media flow recognition module 202 detects media flows 400 that may contain streaming media data from packets received through the network 12. When a new flow begins, one or more packets 204 are sent to the media flow recognition module 202 for detection purposes. In an offline deployment of the QoE system 200, the media flow recognition module 202 receives a copy of each packet and may discard the packet once this payload inspection is complete. In an inline deployment, the media flow recognition module 302 is inline with the traffic and examines the payload before forwarding the packet or modified packet 322 on. These packets 204 are typically organized by unique connections between endpoints (flows) and some data may be tracked in memory. For transmission control protocol (TCP) flows, the packet data may be organized into a contiguous data stream after performing TCP stream reassembly. This allows the handling of out of order packets and dropped packets. Information relating to dropped and/or out of order packets may be stored in memory for later use by other modules.

As data becomes available, the media flow recognition module attempts to determine various attributes and information about the flow 402 and filters the flows 404 if the flow is not a media flow. In a particular case, the session layer or Open Systems Interconnection (OSI) layer 5 protocol can be determined. This determination may be done by, for example, using pattern matching or port matching, though other methods could be used. The data is then extracted 406 by the media flow recognition module. Once the data is extracted 406, the QoE event handler receives the data and detects events 408 related to the subscribers' perceived quality of experience. The media sessions are tracked 410 by the media session module. The media session module can be configured to track the sessions prior to and after the events are detected. The metric measurement module receives data from the QoE event handler and media session module and measures various metrics 412 as explained in greater detail herein. The metric aggregation module then aggregates the metrics 414 followed by the QoE calculation module calculating and comparing the metrics 416. The QoE system may also take corrective action 418 to improve the perceived QoE. This corrective action may take various forms, including for example, an alert via email or an automatic adjustment of the media flow.

Figure 6:
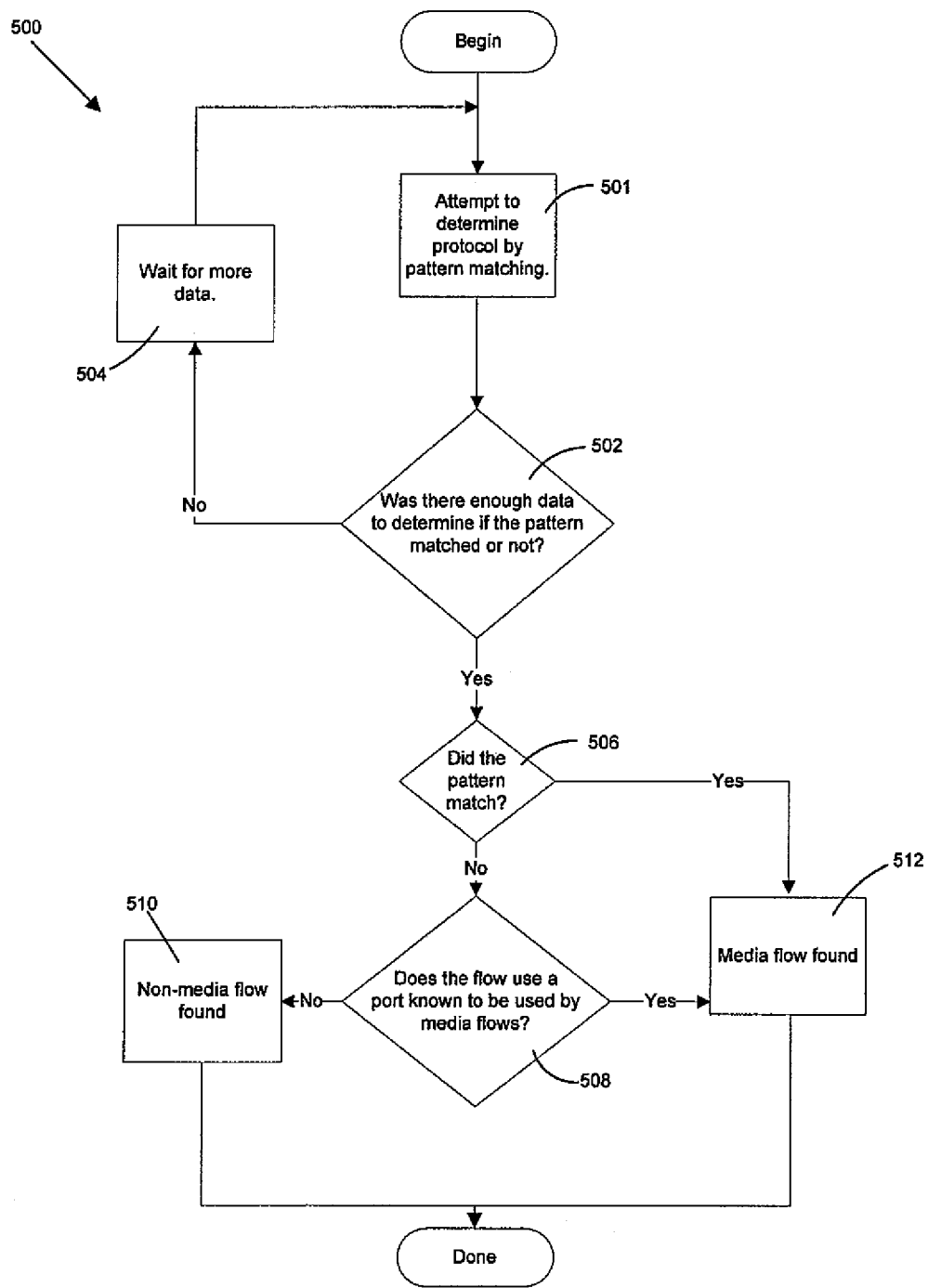
FIG. 6 illustrates an operation of a method of a media recognition module in order to determine a type of the flow.

As shown in FIG. 6, an example method 500 for determining if the flow is a media flow looks for byte patterns near the beginning of the flow data stream 501. If insufficient data is available to check for the pattern 502, the module will wait for more data to arrive 504 before checking for the pattern again 501. The media flow recognition module will then check if the pattern matches a known pattern 506. If there is no match, the protocol may also be found by comparing the TCP or user datagram protocol (UDP) port number to known ports used by media protocols 508. Once the protocol is found, the media flow recognition module then filters out any flows that are not candidates for carrying media 510. The most common video carrier protocols are Hypertext Transfer Protocol (HTTP), Real Time Messaging Protocol (RTMP), and Real Time Streaming Protocol (RTSP), though other carrier protocols exist and may be detected. Of those carrier protocols, HTTP and RTMP may optionally have schemes for adapting the media bandwidth to the available bandwidth, using a technique called adaptive streaming. Once a flow is identified as a candidate for carrying media, such as a video, the flow state is marked for further inspection 512. Flows not matching these criteria are generally no longer examined by the media flow recognition module.

The media flow recognition module includes logic for extracting media data, such as video data, audio data, animation, etc., from different carrier protocols. The video data, if the media is a video, is extracted 406 by the media flow recognition module, after the media flow recognition module determines that the protocol is a candidate for video. The QoE system is intended to be codec agnostic, in that the media stream is recognized and analyzed without regard to the codec used to encode the media stream. The QoE system may parse the container meta-data, which comes independently of the media data that has been encoded with a particular codec. By parsing the container meta-data, the QoE system may support a smaller number of containers to recognize media encoded with any codec, including any new codecs that may become common after the development or deployment of the QoE system. The following example describes how extracting video data can be done for HTTP flows. Similar methods may be used for other protocols.

For HTTP flows, two example methods for determining whether or not the body of the HTTP transaction contains a video are provided. The first method is to check the Content-Type header in the response, which is defined by Request For Comment (RFC) 2616—Hypertext Transfer Protocol [http://www.w3.org/Protocols/rfc2616/rfc2616.html], which is hereby incorporated by reference, to indicate the media type of the entity body. For example, the Content-Type field value "video/x-flv" indicates that the body of the HTTP transaction contains a media file in a flash video (FLV) container. However, not all streaming media providers use this field as intended, as many just leave the Content-Type as "text/plain", even though the body does contain streaming media. To handle these providers, a portion of the body can be scanned to look for patterns relating to known media containers. If these patterns are found, it can be presumed the body contains streaming media. This technique may require more processing and memory and may be more error-prone, but allows the detection of media that otherwise would be missed by only observing the content-type header.

It is common for streaming media providers to split up the media payload into multiple HTTP transactions or into multiple HTTP flows. These transactions are correlated by the media flow recognition module 202 in order to calculate the QoE at the per-media level. This correlation is done differently depending on the chunking method used by the operator. One common way of doing this is to use the Range header, as specified by the HTTP RFC, though other methods exist and may be used by the content provider and interpreted by the QoE system.

Figure 7:
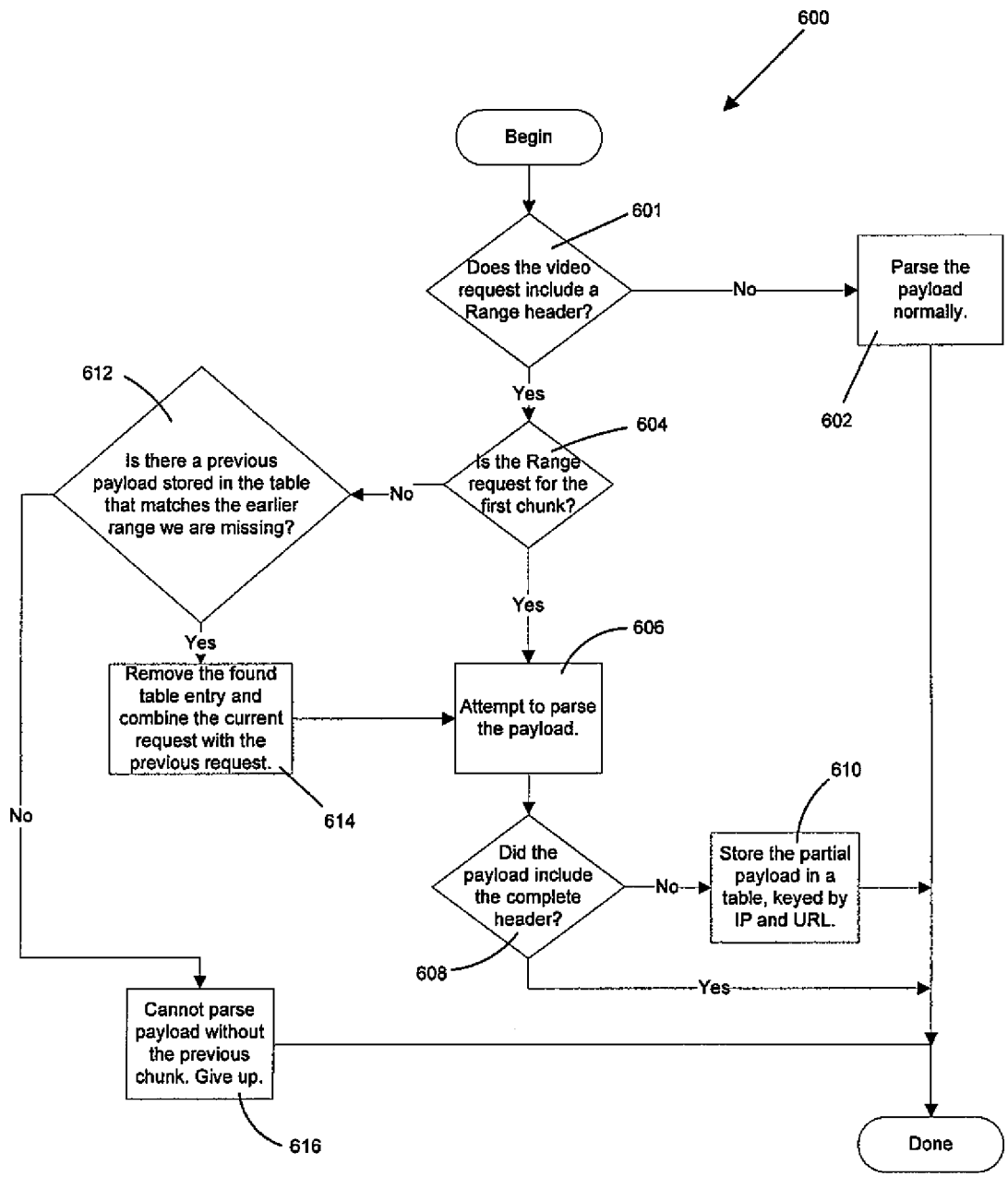
FIG. 7 illustrates an operation of a method to determine a Range header performed by a media recognition module.

For example, in order to handle a video body that is split up using a Range header, an example method 600 is illustrated in FIG. 7. The HTTP request for the split video will contain the Range header 601, which indicates the desired range of bytes from the video. If no Range header is included, the media flow recognition module may parse the payload normally 602. If a Range header is included and if the current transaction contains the first part of the resource 604 (the byte range starts at 0), the media flow recognition module will attempt to parse the body as a video 606. If the first part is not long enough to retrieve the required properties 608, the unparsed portion may be saved 610 with any associated parsing state into a container key, for example, by subscriber IP address and content URL. If the transaction contains a non-first portion of the resource 604 (the byte range start is not equal to zero), the module may attempt to lookup in the saved state container to see a matching previous segment is available 612. If a previous state is found 614, the new transaction is appended onto the existing state and parsing continues 606. If no state is found, the media flow recognition module may ignore or give up on the flow or video 616. Saved states can be timed out after a certain period if they are not used. The full description of this format is available in section 14.45 in RFC2616 (Hypertext Tranfer Protocol—HTTP/1.1) which is hereby incorporated by reference.

In this example, once the video body is recognized as being streaming media and enough data is available, for example, after obtaining and combining multiple transactions and/or flows, the body container is parsed to obtain desired properties such as meta-data related to the media flow. The majority of video container formats contain meta-data fields that list out various properties such as the resolution and the encoded bit rate of the video and audio streams. These fields are placed before the actual media data, so they are located early in the flow. The fields are parsed and the values can be permanently associated with the data flow. How the fields are parsed is dependent on the container being used, but will usually entail parsing the structures and finding the raw values that state the desired properties.

After the properties are obtained by the media flow recognition module, metrics are determined from the flow, such as the achieved useful bandwidth, which is also known as the "goodput". This metric measures how many bytes were received by the client that compose a complete, in-order data stream. Retransmitted bytes are ignored if they have already been seen by the user. Out-of-order data is not accounted for until the missing data segments are transmitted and received by the user. This can be implemented for Transmission Control Protocol (TCP) flows by using the ACK numbers in the TCP header. The ACK number is a number sent in each packet that states that the endpoint sending this packet has successfully received all data up to a certain TCP sequence number. Whenever the endpoint sends a packet with the ACK number increased by some amount, it means the subscriber has successfully received that much useful layer 5 data since the last time a packet with an ACK number was received. For non-TCP flows, such as User Datagram Packet flows, the goodput number can be estimated using the number of layer 5 bytes transmitted, as these protocols may not include sufficient flow management information to detect drops and out-of-order transmissions As noted herein, the QoE event handler is adapted to receive data from the media flow recognition module and detect events 408 related to subscribers' perceived quality of experience. The QoE event handler may obtain attributes related to a particular media flow. These attributes can be used to detect various events, for example, buffering events, media restart events, media start latency events, and adaptive streaming bit rate transition events. There may be many instances of the QoE event handler 206, one for each type of event. Each event handler communicates with the media session manager to keep track of the history of media flows, to detect changes in the media flow properties and to report QoE events to the metric measurement module.

The QoE event handler may detect buffering events such as pauses or stops in the media playback. These events, frequently referred to as stalls, occur whenever the amount of media downloaded matches or is less than the amount of media consumed during real-time playback and the playback must wait for more data to be downloaded. For example, a stall may appear to the subscriber as the video playback freezing on a frame and audio playback stopping completely. Some media players will additionally show an icon to indicate that the playback is stopped until sufficient buffering has been completed. Once the data is available, the media will resume from the point at which the stall occurred, without skipping ahead. A buffer stall event is undesirable from the subscriber's standpoint.

Figure 8:
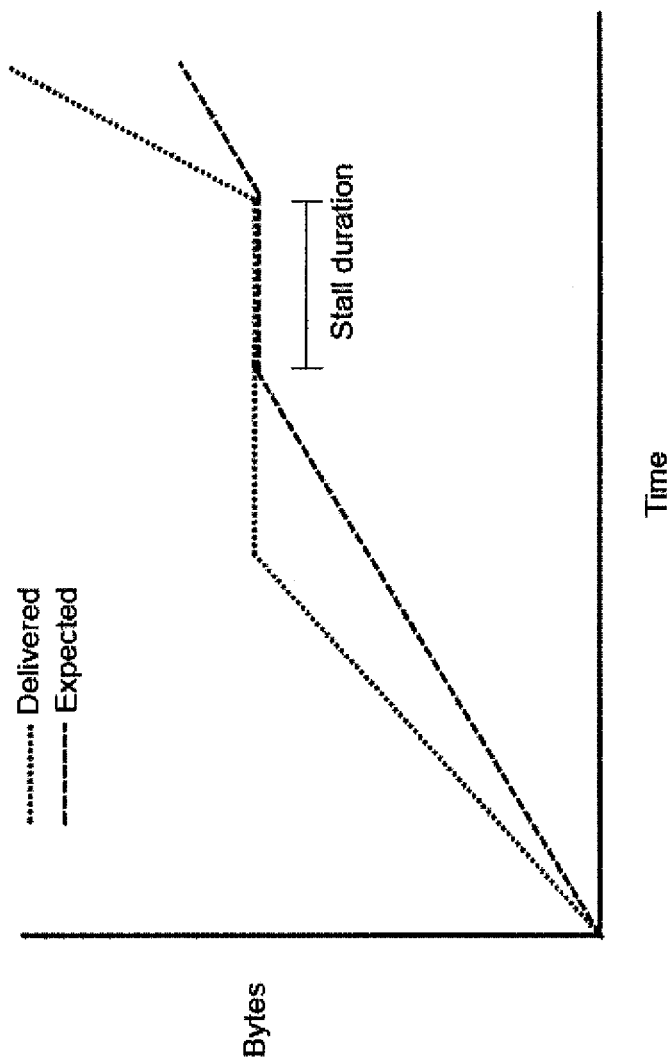
FIG. 8 is a graph illustrating buffer stall events.

FIG. 8 illustrates how buffer stall events can be detected, by the QoE system, for example, by the QoE event handler. In this example, two pieces of information can be used to detect stalls. The first piece of information is the average encoded bit rate. This value describes the average number of bits used to represent a second of real-time playback. The second piece of information is the achieved effective bit rate of the flow containing the video. This bit rate should generally only include the effective bytes or goodput, as described above.

Once these two pieces of information are obtained, the two can be compared in order to model the subscriber-side or client-side buffer. As bytes are transferred to the subscriber, they can be added to those bytes in the subscriber's device playback buffer. As time elapses, the buffer is being exhausted at a rate equal to the average encoded bit rate of the video. If the model states that the buffer has become empty then a stall is detected, as shown in FIG. 8. The stall state will continue until sufficient bytes have been transferred to the subscriber's device buffer in order to resume playback.

Another event that may be detected by the QoE event handler 206 is media start latency. The MSS (Media Streaming Server) 14 start latency refers to the amount of time required between the time that the media stream was requested by the subscriber and the time when playback actually begins. This latency is caused by a combination of factors, including the determination of which server 14 to use, the connection being established with that server or Content Deliver Network (CDN), and the time taken to download enough data for playback to begin. The QoE event handler 206 detects this latency by subtracting the time at which the media was initially requested from the time when the beginning of the media stream is received by the subscriber.

Adaptive-quality technology is being used by a growing number of streaming services. This technology allows the service provider to adjust the encoded bit rate of the media while it is being delivered to adjust to changing availability of bandwidth. The reasoning behind this is that the subscribers would prefer to view a lower bit rate stream as opposed to viewing a high bit rate stream that stalls frequently due to insufficient bandwidth.

Ideally, a stream will be delivered using a high bit rate and would stay at the high bit rate for the duration of the playback. However, during periods of congestion the media may have to shift down to a lower bit rate. These shifts or bit rate transitions can be measured and reported on by the QoE event handler 206 by analyzing the media flow and watching a change in bit rate.

Another event that may be detected by the QoE event handler is media restarts after buffer stall events. As subscribers become more and more frustrated from media stalls, they might request the same media content again with the hope that the media playback will not be interrupted. In order to detect this kind of event, the QoE event handler detects upon the arrival of the media request if the same subscriber requested the same media content recently, by communicating with the media session manager. If the same request was found for the same subscriber and there was at least one buffer stall event, the QoE event handler may subtract the last access time of existing media content from a current request time. If the difference is less than or equal to a predetermined threshold value, for example, approximately 800 to 1000 seconds or 900 seconds, QoE event handler reports a media restart event to the QoE metric measurement module.

The media session manager (MSM) 208 can be configured to enable calculating QoE at the per-media and per-subscriber level by maintaining a history of changes in media flow properties, and grouping these properties for the same media content watched in the same time frame by a subscriber in the form of a media session. A media session involves the properties of all the flows sent and received by a subscriber for the same media from the time when a subscriber requested a media content to the time when the media stream is stopped, which can be either terminated or completed. The MSM 208 may maintain the data as shown in FIG. 9 for every media session. In some cases, the MSM 208 may track and store a subscriber's quality of experience over an extended period, which is intended to allow the QoE system to monitor and observe a subscriber's behaviour over time.

Each media session may be uniquely identified by subscriber IP address, media content URL and media request time. The media session record may contain a set of data or facts that measure certain properties of the media, such as encoded bit rate, downstream and upstream bytes counters, downstream and upstream packets counters, as well as downstream and upstream payload bytes counters. Besides facts, the media session record may also contain dimensions of interest to describe the facts and provide the context at which these facts were measured. Dimensions can also be used in the metric aggregation module to group and aggregate facts based on elements of interest to the network or QoE system. Examples of dimensions include: subscriber geographical location, content provider name, content delivery network name, type of stream, client device name, operating system name, browser name, container name, transport protocol, session protocol, audio codec name, video codec name and resolution The MSM 208 responds to the QoE event handler's 206 requests in order to keep track of the current status of the media session 410 and to help detect QoE events. The MSM 208 also provides the metric measurement module 210 and the metric aggregation module 212 with the information required to calculate various QoE metrics.

Figure 10:
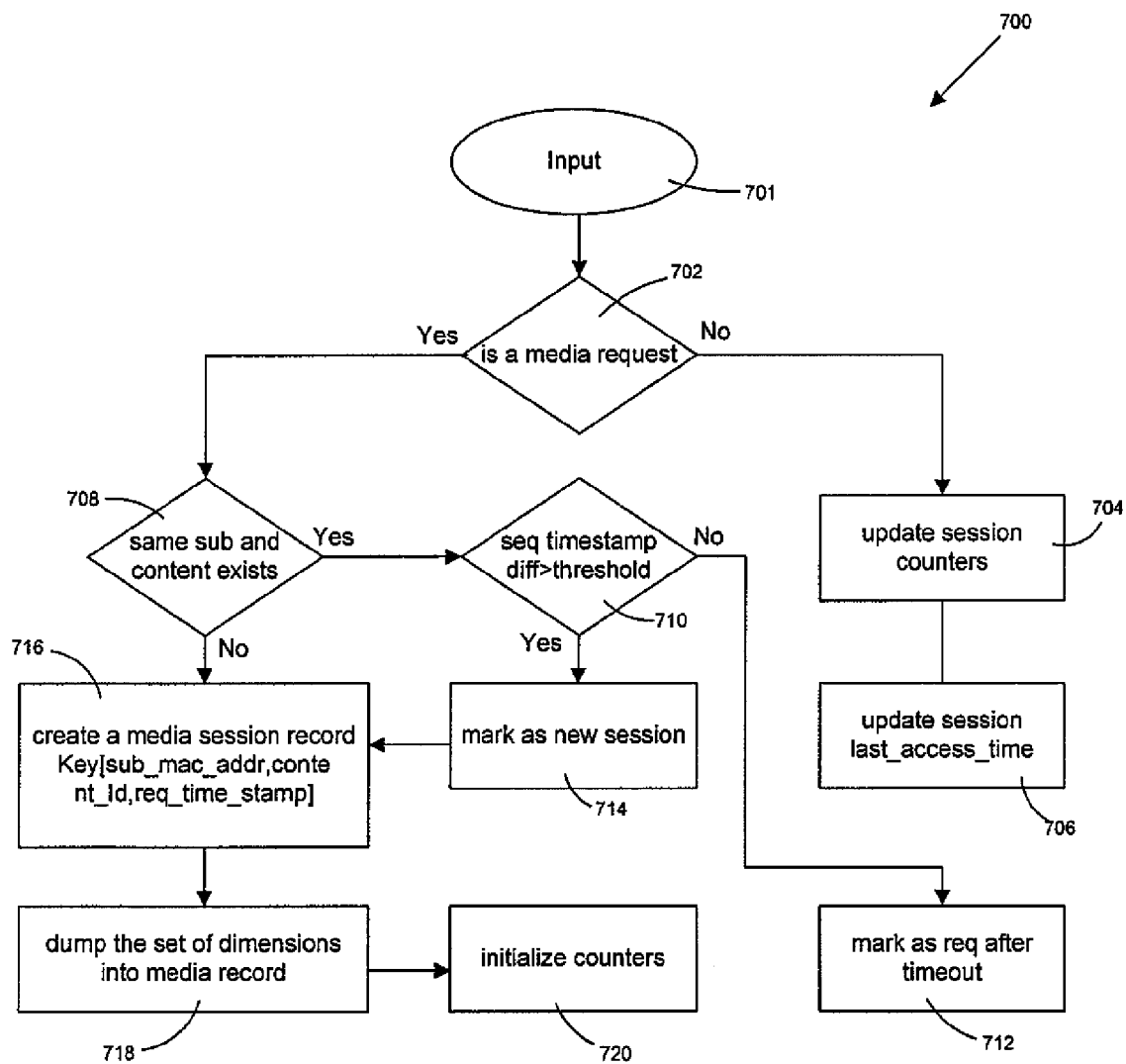
FIG. 10 is a flow chart of the operation of a media session manager.

FIG. 10 is a flow chart of an example embodiment of the logical operation 700 of the media session manager 208. The media session manager receives media input 701 after being filtered and recognized from the modules within the QoE system. The media session manager determines if the input is a media request 702 or a media flow. If the input is a media flow, session counters may be updated 704 as may be the session last access time 706.

If the input is determined to be a media request 702, a record is created the first time a new subscriber IP address, content URL, request start time are recorded. Other information or first time indicators may be used and may be recorded. For cases when the subscriber's device 10 resends requests after time out, which may result in the same content already existing 708, the MSM compares the difference between the time stamp of two consecutive requests to the same media content by the same subscriber against a threshold 710, for example 3 seconds, and determines if this request belongs to the previous one 712 or it is considered as a new media session 714. If the timestamp difference is found above the threshold, the request is considered as new media session and a new session record is created 716. MSM 208 updates the record by the set of dimensions associated with the flow 718, once the MSM received the first flow. The set of counters associated with the session are then initialized 720. The MSM 208 updates the counters with every flow received. The MSM 208 updates the session's last access time with every flow received. The MSM 208 typically keeps media flow sessions for only a predetermined period of time after the last flow in order to make sure that subsequent modules read them. For this reason, the MSM 208 can be configured to keep checking session's last access time and removing session records with (current time−session last access time>=predetermined threshold). In some cases, a media flow session is kept for two sampling intervals, 30 minutes, after receiving the last media flow. This period is intended to allow other modules to have access to the media session record for, for example, calculating and aggregating QoE metrics The metric measurement module receives QoE event data from the QoE event handler and media session records from the MSM and uses the data to measure QoE metrics for each media session. The metric measurement module measures various types of metrics 412 after counting and normalizing QoE events related to subscribers perceived quality of experience, for example:

a) Buffer Stall Duration (BSD) provides information about total time of buffer stall events occurred in the same media session;

b) Buffer Stall Frequency (BSF) provides information about the count of buffer stall events occurred in the same media session;

c) MSS Start Latency (MSL) provides information about the delay time that was required to start receiving the media stream;

d) Bit rate Transition Frequency (BTF) provides information about the count of bit rate transition events occurred in the same media session; and e) Media Restart (MR) indicates if the same media content has been requested after a buffer stall event in the previous media session.

One of the flow properties, which may be recognized or determined by the media flow recognition module 202 is the value of associated dimensions of interest to a network. The metric aggregation module 212 receives metrics from the metric measurement module 210 and aggregates 414 these metrics for dimensions of interest. The following examples describe the benefit of aggregating metrics for subscriber geographical location, content delivery network and content provider name. Similar benefits may be obtained when aggregating other dimensions.
  a) Geographical region or location of the subscriber provides information about which part of the network is streaming media, which can be used to map flows to certain region of the network topology. Knowing the geographical location is intended to help identifying risky areas in the network with low QoE that require further attention.
  b) Content delivery network (CDN) provides information about the CDN providing media streaming to the subscribers. This information is intended to help in ranking CDNs according to their average QoE scores, and uses this information when triggering events that improve QoE, such as redirecting requests from a congested CDN to a non-congested secondary CDN with equivalent content.
  c) Content provider provides information about the provider of the media streaming. The content provider information can also help when triggering events that improve QoE as described with the CDN.

Other dimensions of interest may also be determined by the media flow recognition module 102 and aggregated in a similar fashion.

The metric aggregation module 212 calculates metrics per media session and per subscriber for each set of dimensions being tracked. The aggregation may involve, for example, taking an average of the results. For example, if the dimension of interest is geographical region (GeoX) in the network, then the metric aggregation module 208 may calculate:
  a) Average BSD per media session for all media streaming in GeoX;
  b) Average BSF per media session for all media streaming in GeoX;
  c) Average MSL per media session for all media streaming in GeoX;
  d) Average BTF per media session for all media streaming in GeoX; and
  e) Average MR events count per media session for all media streaming in GeoX.

The QoE system measures QoE from aggregated metrics, taking into account the demands of the ISPs. In other words, the measured QoE is a relative quality measure derived from comparing the aggregated metrics against a threshold value or level such as the maximum allowed QoE metrics in the network. In some cases, high QoE values indicate good subscribers' experience as a result of extremely low QoE events (extremely low BSD, BSF, MSL, BTF, MR), and low QoE values indicate bad subscribers' experience as a result of extremely high QoE events (extremely high BSD, BSF, MSL, BTF, MR) which are close to or exceeding the maximum allowed values in the network.

The following sets of variables may be adjusted by ISPs taking into account their network capability and subscribers expectations:
  1) Maximum allowed BSD per media session ($\alpha$);
  2) Maximum allowed BSF per media session ($\beta$);
  3) Maximum allowed MSL per media session ($\mu$);
  4) Maximum allowed BTF per media session ($\omega$); and
  5) Maximum allowed MR events per media session ($\phi$).

The concept of distance to an ideal point or distance between points may be used by the QoE calculation module to calculate multi-criteria optimization for determining QoE 416. In this case, an ideal QoE is a theoretical QoE defined in the metric space, each of whose elements is the optimum of a metric's value (zero BSD, zero BSF, zero MSL, zero BTF, zero MR).

To make QoE comparable, the measurements can be normalized over the aggregated metrics in the range of [0-10] using a weighted average of the maximum allowed metrics value in the network as follows:

| Normalized Aggregated QoE Metric | Normalized value |
| --- | --- |
| Normalized Buffer Stall Duration ($BSD_N$) | 10 (Avg BSD/$\alpha$) |
| Normalized Buffer Stall Frequency ($BSF_N$) | 10 (Avg BSF/$\beta$) |
| Normalized MSS Start Latency ($MSL_N$) | 10 (Avg MSL/$\mu$) |
| Normalized Bit rate Transition Frequency ($BTF_N$) | 10 (Avg BTF/$\omega$) |
| Normalized Media Restart ($MR_N$) | 10 (Avg MR/$\phi$) |

In case any of the values of the aforementioned metrics exceeds the maximum allowed value, its normalized value can be set to 10 (i.e. maximum value).

In some cases, QoE is calculated in the range of [0, 10] from the normalized Euclidean distance between normalized aggregated QoE metrics and the ideal QoE represented by the ideal values of these metrics (i.e. no QoE events at all), as follows:

$$QoE = 10[(\text{max distance} - \text{actual distance})/\text{max distance from ideal QoE}]$$

Since not all of the metrics may apply to progressive and adaptive streaming, it is possible to use various alternative formulas for calculating QoE.

In an example where all of the above metrics apply to adaptive streaming, the following metrics can be used to calculate QoE: $BSD_N$, $BSF_N$, $MSL_N$, $BTF_N$, and $MR_N$. In this case, the maximum distance is between the maximum values (10, 10, 10, 10, 10) and the ideal values (0, 0, 0, 0, 0) of these metrics, which equals to $[(10-0)^2+(10-0)^2+(10-0)^2+(10-0)^2+(10-0)^2]^{1/2} = 10\sqrt{5}$ In this example, QoE for adaptive streaming is calculated as follows:

$$QoE_{adaptive} = 10 \times [(10\sqrt{5} - \sqrt{(BSD_N^2 + BSF_N^2 + MSL_N^2 + BTF_N^2 + MR_N^2)})/10\sqrt{5}]$$

$QoE_{adaptive}$ is in the range of [0, 10]. Low values of $QoE_{adaptive}$ indicate poor quality of experience, while high $QoE_{adaptive}$ values indicate excellent quality of experience for subscribers watching adaptive streaming.

In an example of progressive streaming, which is a special case of adaptive streaming where bit rate is fixed; four metrics can be used to calculate QoE: $BSD_N$, $BSF_N$, $MSL_N$, and $MR_N$. The formula may be derived in a similar fashion, but without including a bit rate transition frequency as bit rate may be fixed during progressive streaming. In this case the maximum distance is between the maximum values (10, 10, 10, 10) and the ideal values (0, 0, 0, 0) of these metrics, which equals to $[(10-0)^2+(10-0)^2+(10-0)^2+(10-0)^2]^{1/2} = 20$ In this example, QoE for progressive streaming is calculated as follows:

$$QoE_{progressive} = 10 \times [(20 - \sqrt{(BSD_N^2 + BSF_N^2 + MSL_N^2 + MR_N^2)})/20]$$

$QoE_{progressive}$ is in the range of [0, 10]. Low values of $QoE_{progressive}$ indicate poor quality of experience, while high $QoE_{progressive}$ values indicate excellent quality of experience for subscribers watching progressive streaming. It will be understood that the above formulas are based on the metrics described above and the formulas may be adjusted if more or fewer metrics are measured and aggregated.

After the metric aggregation module has determined a QoE of the media stream per subscriber or per session, the QoE system may provide a report to be viewed by the operator or ISP. Reporting can be used to analyze long-term trending and drill into data to investigate the causes of low QoE scores. The QoE system may send raw data from the measurements to a storage system that will store the metrics in a long-term storage medium, or the memory component of the QoE system may be equipped to store the metrics for a longer period of time, for example one week, one month, or over a five year period. Then at some later time, the QoE system can extract the raw data from long-term storage and create reports various trending or historical analysis to investigate causes or trends in low QoE scores. For example, reports may be compiled as follows:

- A report breaking down QoE by (media provider, CDN, region). The operator or ISP may use this report to pinpoint problems in a particular region, CDN or media provider.
- A report showing the historical trend of QoE over time. The operator or ISP may establish a QoE range and may have a report generated if the QoE moves outside the established range.

Once a low media QoE is detected, the QoE improvement module 320 may take actions 418 to improve the quality of experience for that session, if in-line, as well as similar sessions in the future. The QoE improvement module, once notified of a QoE score or value by the QoE calculation module, may communicate with the media session manager in order to track changes with respect to the QoE score. The QoE improvement module 320 may use the stored values in the media session manager to compare current QoE score with previous scores for the same set of facts and/or dimensions and use the results to trigger corrective actions.

Improvement actions may include modifying the traffic in a way that is intend to be transparent to the end user, and without requiring explicit support on either the subscribers' side or the content delivery side. These methods are a low impact and low cost way of improving subscriber QoE without changing other parts of the providers' network and are described in further detail below. In some cases, the QoE improvement module 320 may be operatively connected with the media session manager 308. The QoE improvement module 320 may receive and compare current session and/or subscribers data or readings with previous sessions and/or subscriber data and take action depending on the results of the comparison.

A consumer network typically includes a series of limited bandwidth connections. As the amount of bandwidth used nears the capacity of the link, the performance of the link may drop in terms of latency and other network quality metrics. This in turn may cause a poor quality of experience for the subscribers. Whether or not congestion actually effects the subscriber is currently hard to detect, as the subscriber may be using the connection for non-latency sensitive use-cases. Focusing on media QoE instead of general QoE allows the operator or ISP to be more precise and effective when applying corrective action.

Corrective action may be done through traffic prioritization by, for example, subscriber tier or traffic type. For example, subscribers that pay more money for faster Internet will be prioritized over subscribers with lower-price plans. Another example is prioritizing latency sensitive applications over lower-priority applications.

In some cases, using real time QoE metrics may be beneficial if the QoE system 200 knows the amount of bandwidth required for a high QoE video, and the video is being downloaded at a higher bandwidth than necessary, the video can be shaped down to just above the required amount to free up bandwidth without affecting the subscriber's QoE.

Figure 11:
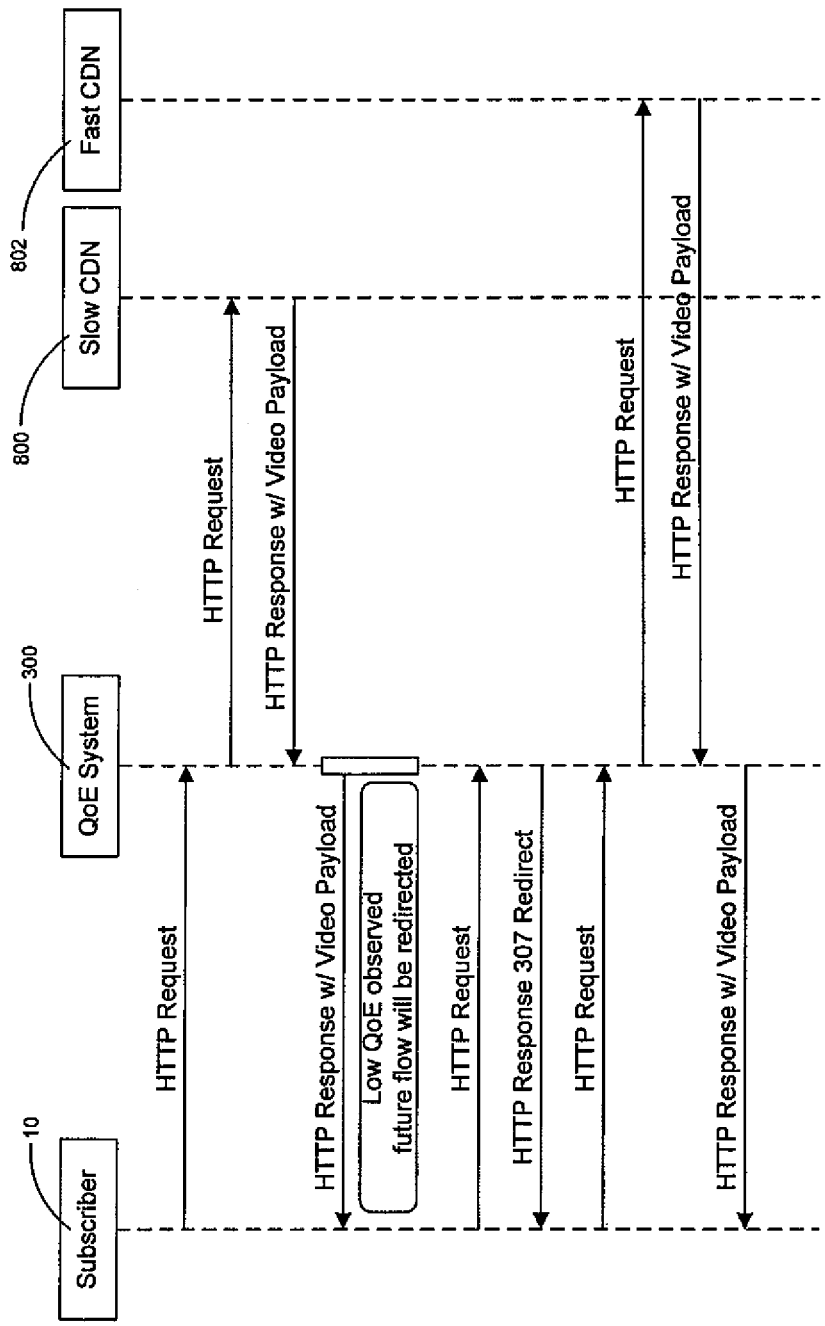
FIG. 11 illustrates a sequence diagram with the operation of a system for measuring and improving QoE using a Content Delivery Network redirection method.

CDNs are distributed networks that provide the same cached content to different sections of users, usually based on locality. FIG. 11 is a sequence diagram of an embodiment where the logical operation of the QoE event improvement module uses CDN redirection. The QoE system 300 measures QoE metrics and aggregates the metrics by unique CDN node. If a low QoE is observed as a result of large discrepancy in the ability for one CDN node to deliver video content to subscribers, the QoE system 300 can redirect new media requests from one congested node to another less congested node, using redirects, such as standard HTTP 307 redirects. The redirects are intended to be transparent to the subscribers; therefore not affecting the subscriber's QoE.

FIG. 11 describes an example process for redirecting a media consumer from one CDN to another. First, a problematic CDN 800 is identified. This may be done by observing other subscribers' media sessions with that CDN. In many cases, the subscriber 10 requests the media over HTTP, and the QoE system 300 with the QoE Improvement Module (QIM) 320 monitors these media flows inline. Until the CDN 800 is identified as slow, the media flows may simply pass through the QIM unmodified. However, once the CDN 800 is identified as slow and another CDN 802 is identified as fast, as compared with each other, future requests may be intercepted by the QIM and not passed on the to slow CDN 800. Instead, in one example, a response is forged, appearing to come from the slow CDN 800, directing the user to request the same content from another location. The subscriber's device or media player should interpret this request and make the same request to the other faster CDN 802. This time, the QIM allows the request through, and the user receives the media payload from the faster CDN 802. The QIM is configured to redirect requests from a congested resource to a less congested secondary resource with equivalent content. In some cases, the QIM may handle the redirection directly rather than relying on the subscriber's device. In some cases, the QIM may shape media flows with unnecessarily high quality of experience, for example, may reduce the streaming speed of a video in a case where the download speed significantly surpasses the speed at which the video is being played. The media flows may be shaped using network traffic shaping techniques known in the art.

In the preceding description, for purposes of explanation, numerous details are set forth in order to provide a thorough understanding of the embodiments. However, it will be apparent to one skilled in the art that these specific details are not necessarily required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A network-based method for measuring quality of experience for media streaming in a network comprising:
   receiving a plurality of data flows between a plurality of sources and destinations on a network, via a media flow recognition module;
   for each of the plurality of data flows:
      identifying a media stream within the data flow, via the media flow recognition module;
      detecting at least one event related to the media stream indicative of a quality of experience as perceived by a subscriber, via a quality of experience (QoE) event handler; and
      measuring a plurality of metrics relating to the media stream based on the detected event, the metrics being selected from the group consisting of: buffer stall duration; buffer stall frequency; media streaming server start latency, bit rate transition frequency, and media restart, via a metric measurement module;
   aggregating each of said metrics over the plurality of data flows over a dimension of interest related to the network, via a metric aggregation module;
   normalizing each aggregated metric over a selected range based on a threshold value for each aggregated metric, via a quality of experience calculation module;
   calculating a quality of experience value based on the normalized aggregated metrics via the quality of experience calculation module; and
   taking corrective action comprising modifying at least one of the data flows based on the calculated quality of experience value, via a quality of experience improvement module.

2. The method of claim 1 wherein the media stream comprises a progressive media stream and said metrics measured are associated with progressive media streaming.

3. The method of claim 1 wherein the media stream comprises an adaptive media stream.

4. The method of claim 1 wherein the at least one event comprises bit rate transitions of content in the media stream and one of said metrics comprises a number of bit rate transitions as an indicator of quality of experience in the network.

5. The method of claim 1, wherein the measured metrics are measured without regard to a codec used to encode the media stream.

6. The method of claim 1, wherein the corrective action further comprises sending an alert to a network operator.

7. The method of claim 1, wherein the dimension of interest is selected from a group comprising: subscriber geographical location, content provider name, content delivery network name, type of stream, client device name, operating system name, browser name, container name, transport protocol, session protocol, audio codec name, video codec name, and resolution.

8. The method of claim 1, wherein the dimension of interest is an aggregation of facts configured to measure properties of the media stream.

9. The method of claim 8, wherein the properties of the media stream are selected from a group comprising: encoded bit rate, downstream byte counters, upstream byte counters, downstream packet counters, upstream packet counters, downstream payload bytes counters, upstream payload byte counters.

10. The method of claim 1, wherein the corrective action comprises redirecting a media stream between nodes.

11. A network-based system for measuring quality of experience (QoE) for media streaming as perceived by subscribers in a network, the system comprising:
    at least one processor for processing data;
    at least one memory component for storing data;
    a media flow recognition module configured, using the at least one processor and the at least one memory component, to receive a plurality of data flows between a plurality of sources and destinations on a network and for each of the plurality of data flows, identify a media stream within the data flow;
    a QoE event handler operatively connected to the media flow recognition module, and configured to, using the at least one processor and the at least one memory component, detect at least one event related to the media stream indicative of a quality of experience as perceived by a subscriber, for each of the plurality of data flows;
    a metric measurement module operatively connected to the QoE event handler and configured to measure metrics relating to the media stream based on the at least one detected event for each of the plurality of data flows;
    a metric aggregation module configured to, using the at least one processor and the at least one memory component, aggregate each of said metrics over the plurality of data flows over a dimension of interest related to the network, the metrics being selected from the group consisting of: buffer stall duration; buffer stall frequency; media streaming server start latency, bit rate transition frequency, and media restart;
    a quality of experience calculation module operatively connected to the metric aggregation module and configured to, using the at least one processor and the at least one memory component, normalize each aggregated metric over a selected range based on a threshold value for each aggregated metric and to calculate a quality of experience value based on the normalized aggregated metrics; and
    a quality of experience improvement module configured to take corrective action comprising modifying at least one of the data flows of the network based on the calculated quality of experience value.

12. The system of claim 11 wherein the quality of experience improvement module is configured to modify the media stream based on the quality of experience measurement.

13. The system of claim 11 wherein the quality of experience improvement module is configured to shape media flows which have an inappropriate quality of experience.

14. The system of claim 11 wherein the quality of experience improvement module redirects requests from a congested resource to a less congested secondary resource with equivalent content.

15. The system of claim 11, further comprising a media session manager operatively connected to the QoE event handler and configured to track and store dimensions of interest of the media stream.

16. The system of claim 11, wherein the metric aggregation module is configured to aggregate each of said metrics over a dimension of interest selected from the group consisting of geographic region, content delivery network, and content provider.

17. The system of claim 11, wherein the corrective action further comprises sending an alert to a network operator.

18. The system of claim 11, wherein the dimension of interest is selected from a group comprising: subscriber geographical location, content provider name, content delivery network name, type of stream, client device name, operating system name, browser name, container name, transport protocol, session protocol, audio codec name, video codec name, and resolution.

19. The system of claim 11, wherein the dimension of interest is an aggregation of facts configured to measure properties of the media stream.

20. The system of claim 11, wherein the corrective action comprises redirecting a media stream between nodes.

\* \* \* \* \*